(12) United States Patent
Capoldi et al.

(10) Patent No.: US 11,067,128 B2
(45) Date of Patent: Jul. 20, 2021

(54) ROLLING BEARING, NOTABLY LARGE-DIAMETER ROLLING BEARING

(71) Applicant: Aktiebolaget SKF, Gothenburg (SE)

(72) Inventors: Bruno Capoldi, Charentenay (FR); Herve Dondaine, Avallon (FR)

(73) Assignee: Aktiebolaget SKF, Gothenburg (SE)

(*) Notice: Subject to any disclaimer, the term of this patent is extended or adjusted under 35 U.S.C. 154(b) by 0 days.

(21) Appl. No.: 16/789,463

(22) Filed: Feb. 13, 2020

(65) Prior Publication Data

US 2020/0340533 A1    Oct. 29, 2020

(30) Foreign Application Priority Data

Apr. 26, 2019 (DE) .......................... 102019206040.4

(51) Int. Cl.
*F16C 33/60*    (2006.01)

(52) U.S. Cl.
CPC .................................... *F16C 33/60* (2013.01)

(58) Field of Classification Search
CPC .............................. F16C 33/60; F16C 2300/14
See application file for complete search history.

(56) References Cited

U.S. PATENT DOCUMENTS

| 2,528,987 | A | * | 11/1950 | Charles | ................. | F16C 33/605 |
| | | | | | | 384/570 |
| 4,906,112 | A | * | 3/1990 | Gobel | .................... | F16C 19/381 |
| | | | | | | 384/548 |
| 2014/0112606 | A1 | * | 4/2014 | Greenfield | .............. | F16C 19/38 |
| | | | | | | 384/450 |

FOREIGN PATENT DOCUMENTS

| DE | 962125 C | * | 4/1957 | ............. F16C 33/60 |
| GB | 1419225 A | * | 12/1975 | ............. F16C 19/28 |
| JP | 02304216 A | * | 12/1990 | ............. F16C 41/045 |
| JP | 2002227852 A | * | 8/2002 | ............. F16C 33/60 |
| WO | WO-2009031448 A1 | * | 3/2009 | ............. F03B 11/06 |
| WO | WO-2013147510 A1 | * | 10/2013 | ............. F03D 80/70 |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A rolling bearing includes an inner ring and an outer ring, at least the inner ring or the outer ring being split into a plurality of successive circumferential ring segments. The rolling bearing further includes at least one alignment member circumferentially interposed between each pair of facing ends of the successive ring segments of the split-ring. The alignment member being secured onto a first one of the facing ends and protruding into a recess formed onto a second one of the facing ends to align the pair of facing ends in radial and axial directions.

11 Claims, 3 Drawing Sheets

ROLLING BEARING, NOTABLY LARGE-DIAMETER ROLLING BEARING

CROSS-REFERENCE TO RELATED APPLICATIONS

This application claims priority to German Patent Application no. 102019206040.4, filed Apr. 26, 2019, the contents of which is fully incorporated herein by reference.

FIELD OF THE INVENTION

The invention relates to the field of large-diameter rolling bearings, notably those used in a tunnel boring machine, or in the field of defence such as radars, chars, or excavator applications. Large-diameter rolling bearings may also be used for the mounting of rotor blades on wind turbines.

BACKGROUND OF THE INVENTION

A large-diameter rolling bearing comprises generally two concentric inner and outer rings, and at least one row of rolling elements radially interposed between the rings.

In some fields of applications, the rolling bearing is delivered with inner and outer rings formed as split-rings in order to allow the transport, and/or the assembly on the corresponding machine. In such case, each of the inner and outer rings is split into a plurality of successive circumferential ring segments.

Therefore, after delivery, the ring segments must be joined together to assemble each split-ring.

However, during assembly, the ring segments may not be aligned in the axial direction as well as the radial direction. In this case, the assembly process of the rolling bearing is interrupted until the ring segments are disassembled and then realigned.

This adjustment step may be laborious, interrupts the assembly process and leads to increased costs of the overall rolling bearing.

One aim of the present invention is to overcome these drawbacks.

SUMMARY OF THE INVENTION

In one embodiment, the rolling bearing comprises an inner ring and an outer ring, at least the inner ring or the outer ring being split into a plurality of successive circumferential ring segments.

According to a general feature of the invention, the rolling bearing further comprises at least one alignment member circumferentially interposed between each pair of facing ends of the successive ring segments of the split-ring.

The alignment member is secured onto one of the facing ends and protrudes into a recess formed onto the other facing end to align the pair of facing ends in radial and axial directions With such an arrangement, the ring segments of the split ring may be easily and perfectly aligned in the axial direction and the radial direction during assembly. The use of such alignment member facilitates the assembly and avoids to disassemble the split ring in cases where the alignment of the ring segments is not perfect. The overall costs can be reduced and the process may be facilitated.

The alignment member may be secured into a recess formed onto the facing end, the recess facing the recess formed onto the other facing end.

In a particular embodiment, the rolling bearing comprises a first alignment member extending axially and a second alignment member extending radially which are circumferentially interposed between the pair of facing ends of the successive ring segments of the split-ring. In this case, each of the first and second alignment members may comprise a pin, for example a spherical pin.

Alternatively, only one alignment member may be circumferentially interposed between the pair of facing ends. In this case, the alignment member may be spherical (to be confirmed).

Chamfers may be provided for better adjustment between each recess on the associated facing end of the ring segment.

The rolling bearing may advantageously further comprise fixing means to secure together the successive ring segments of the split-ring. In one embodiment, the fixing means are secured onto the outer surface of the split-ring.

A circumferential space may be provided between each pair of facing ends of the successive ring segments of the split-ring.

In a particular embodiment, the rolling bearing further comprises a plate circumferentially interposed between the pair of facing ends to close the circumferential space.

The rolling bearing may further comprise at least one row of rolling elements radially interposed between raceways of the inner and outer rings. In such case, the plate may delimit locally the raceway of the split-ring. The rolling element may be for example balls. Alternatively, the use of other type of rolling elements, for example cylindrical rollers, can also be considered. The rolling elements can be arranged in cages for example made of plastic, steel, etc. The cage may also be segmented or made in one part. Alternatively, the rolling bearing may comprise a plurality of spacers disposed circumferentially between the rolling elements.

Advantageously, the alignment member is set back or flush with respect to frontal faces of the split-ring. Accordingly, the alignment member does not project in the axial direction beyond the frontal faces of the split-ring. Thanks to this arrangement, in the axial direction, there is no additional space requirement for the mounting of the alignment member.

Alternatively or in combination, the alignment member may be set back or flush with respect to the bore and the outer surface of the split-ring. Accordingly, the alignment member does not project in the radial direction beyond the bore and the outer surface of the split-ring. Thanks to this arrangement, in the radial direction, there is no additional space requirement for the mounting of the alignment member.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
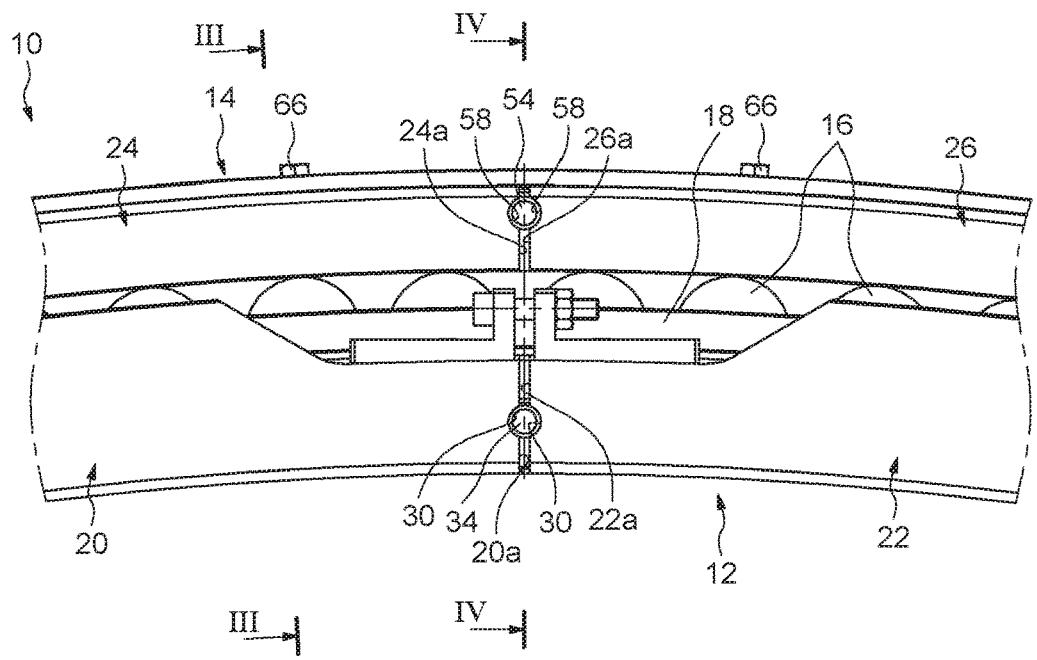
FIG. 1 is a partial side view of a rolling bearing according to a first example of the invention.
Figure 2:
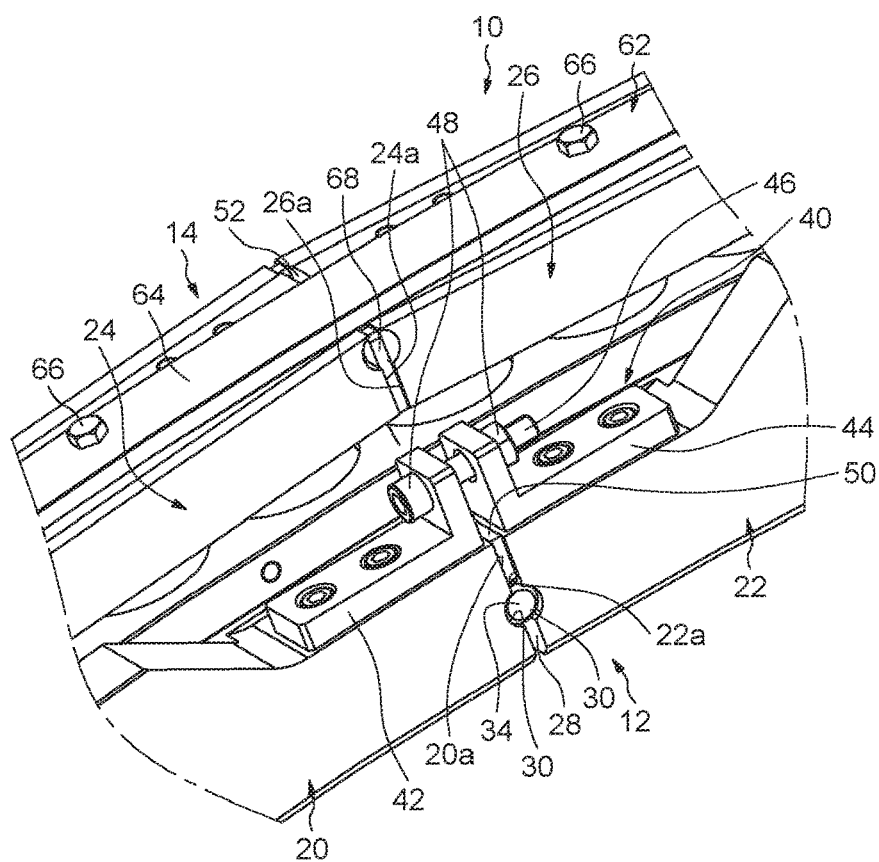
FIG. 2 is a partial perspective view of the rolling bearing of FIG. 1.

The rolling bearing 10 as illustrated on FIGS. 1 and 2 is a large-diameter rolling bearing comprising an inner ring 12 and outer ring 14. The inner and outer rings 12, 14 are concentric and extend axially along the bearing rotation axis X-X' (FIGS. 3 and 4) which runs in an axial direction.

The rolling bearing 10 may for example be used in a tunnel boring machine, a wind turbine or any other applications using a large diameter rolling bearing.

Figure 3:
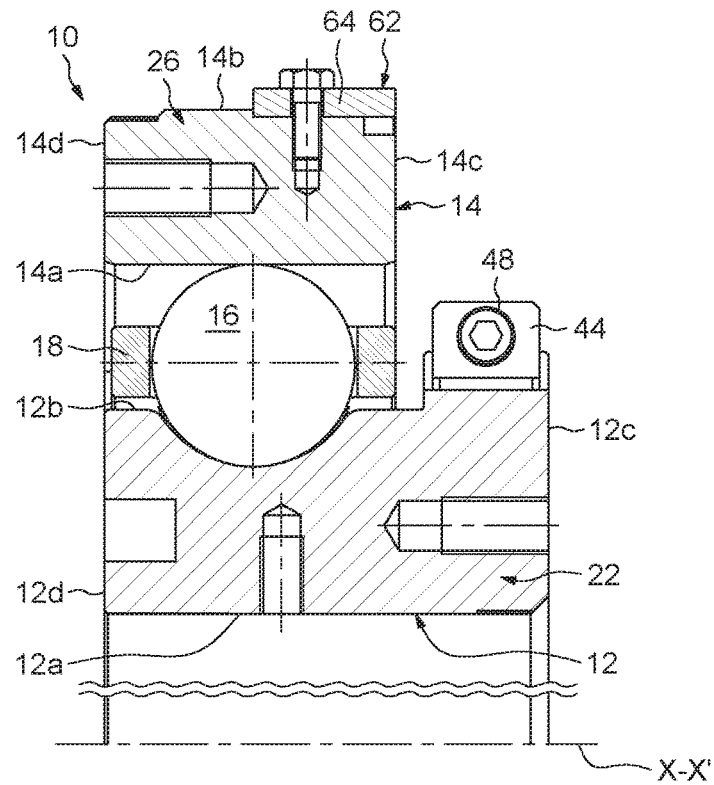
FIG. 3 is a section on of FIG. 1.

As shown more clearly on FIG. 3, the rolling bearing 10 also comprises a row of rolling elements 16, which are provided here in the form of balls, mounted between the inner and outer rings 12, 14. The rolling bearing 10 further comprises a cage 18 for maintaining the regular circumferential spacing of the rolling elements 16.

The outer ring 14 comprises a cylindrical bore 14a, an outer cylindrical outer surface 14b, and two opposite radial frontal lateral faces 14c, 14d which axially delimit the bore 14a and the outer surface 14b. In the disclosed example, the cylindrical bore 14a delimits the raceway for the rolling elements 16. Alternatively, a toroidal circular raceway may be formed on the bore 14a of the outer ring to delimit the raceway.

The inner ring 12 comprises a cylindrical bore 12a and an outer cylindrical surface 12b from which a toroidal circular raceway (not referenced) for the rolling elements 16 is formed, the raceway being directed radially outwards. The inner ring 12 further comprises two opposite radial frontal lateral faces 12c, 12d which axially delimit the bore 12a and the outer surface 12b of the ring. The lateral face 12d of the inner ring is coplanar with the lateral face 14d of the outer ring. The lateral face 12c of the inner ring is axially offset outwards with regard to the lateral face 14c of the outer ring.

Referring once again to FIGS. 1 and 2, the inner ring 12 is segmented and is formed by two successive circumferential ring segments 20, 22. The inner ring 12 is formed as a split-ring.

The outer ring 14 is also formed as a split-ring. The outer ring 14 is also formed by two successive circumferential ring segments 24, 26. Alternatively, at least one of the inner and outer rings 12, 14 may be formed by at least three successive ring segments.

In the disclosed embodiment, the axial length of the inner ring 12 is greater than the one of the outer ring 14 in order to held together the ring segments 20, 22 of the inner ring by fitting bolts as will be described later.

The ring segments 20, 22 forming the inner ring 12 are identical one to another. Each ring segment 20, 22 comprises a first end 20a, 22a and a second end (not visible in Figures) which delimit the ring segment in the circumferential direction. The first ends 20a, 22a of the ring segments 20, 22 face each other in the circumferential direction. A circumferential space 28 is provided between the first ends 20a, 22a. The second ends of the ring segments 20, 22 also face each other in the circumferential direction. A circumferential space is also provided between these second ends.

As shown on FIGS. 1, 2 and 3, a first axial recess 30 is formed on each first end 20a, 22a of the ring segments 20, 22. The recesses 30 face each other in the circumferential direction. The recesses 30 are identical. Each recess 30 extends axially from the lateral face of the ring segment 20, 22 delimiting partly the lateral face 12c of the inner ring. Each recess 30 extends axially into the thickness of the ring segment 20, 22. Here, each recess 30 is a blind recess.

Figure 4:
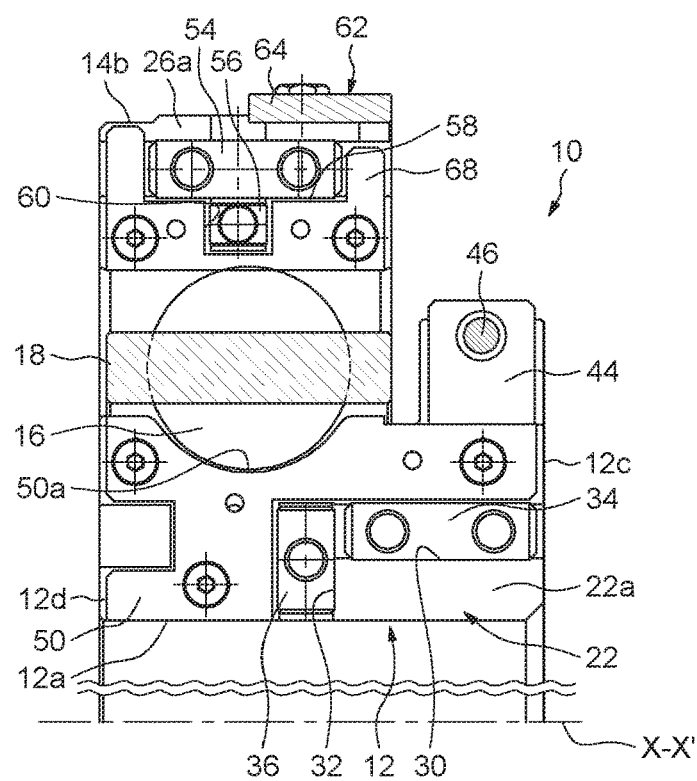
FIG. 4 is a section on IV-IV of FIG. 1.

A second radial recess 32 is also formed on each first end 20a, 22a of the ring segments 20, 22. Only the second radial recess 32 formed on the first end 22a of the ring segment 22 is visible (FIG. 4).

The second radial recesses 32 face each other in the circumferential direction. The recesses 32 are identical. Each recess 32 extends radially from the bore of the ring segment 20, 22 delimiting partly the bore 12a of the inner ring. Each recess 32 extends radially into the thickness of the ring segment 20, 22 and remains radially distant from the outer surface of the ring segment. In the disclosed example, each radial recess 32 opens into the axial recess 30. Alternatively, the radial recess 32 may be spaced apart with respect to the axial recess 30 in the radial direction.

In order to align the first ends 20a, 22a of the ring segments 20, 22 of the inner ring, the rolling bearing 10 further comprises an axial pin 34 and a radial pin 36 respectively located into the recesses 30, 32 of the ring segments.

The axial pin 34 extends into both the recesses 30 of the ring segments 20, 22 of the inner ring. The pin 34 extends axially into the recesses 30. The pin 34 is entirely housed inside the recesses 30 in the axial direction. The pin 34 is set back with respect to the lateral face 12c of the inner ring. The pin 34 also extends circumferentially into the recesses 30. The pin 34 is secured onto one of the first ends 20a, 22a of the ring segments 20, 22 of the inner ring, here onto the first end 22a. The pin 34 may be secured onto the first end 22a by any appropriate means, here by screwing.

The radial pin 36 extends into both the recesses 32 of the ring segments 20, 22 of the inner ring. The pin 36 extends radially into the recesses 32. The pin 36 is entirely housed inside the recesses 32 in the radial direction. The pin 36 is set back with respect to the bore 12a of the inner ring. The pin 36 also extends circumferentially into the recesses 32. Similarly to the axial pin 34, the radial pin 36 is also secured onto the first end 22a of the ring segment 22 by screwing.

The shape of the recesses 30, 32 is complementary to that of the associated pin 34, 36. In the disclosed example, each pin 34, 36 has a cylindrical shape. Alternatively, each pin 34, 36 may have different cross-sections shapes, for example rectangular, square, etc.

With the axial pin 34, the first ends 20a, 22a of the ring segments 20, 22 of the inner ring are positioned to each other in the radial direction. The radial pin 36 enables the first ends 20a, 22a of the ring segments 20, 22 to be positioned to each other in the axial direction. Accordingly, the first ends 20a, 22a of the ring segments 20, 22 are aligned in the radial direction as well as the axial direction.

Similarly to the first ends 20a, 22a of the ring segments 20, 22 of the inner ring, the rolling bearing 10 also comprises an axial pin and a radial pin (not visible in Figures) which are circumferentially interposed between the second ends of the ring segments 20, 22.

The rolling bearing 10 further comprises first and second fixing means 40 to secure together the ring segments 20, 22 of the inner ring. Only the first fixing means 40 are visible in Figures.

The first fixing means 40 comprise two flanges 42, 44 secured onto the outer surface of the inner ring 12. The flanges 40, 42 are secured onto the part of the inner ring 12 which axially protrudes relative to the outer ring 14. The flange 42 is secured to the ring segment 20 while the flange 44 is secured to the ring segment 22. The flanges 42, 44 is secured near to the circumferential space 28 provided between the first ends 20a, 22a of the ring segments 20, 22. The first fixing means 40 are also provided with a bolt 46 extending through holes of the flanges 42, 44, and with screw-nuts 48 fixing the bolt. The second fixing means are identical to the first fixing means 40. The first and second fixing means are diametrically opposed.

The rolling bearing 10 further comprises a plate 50 which closes the space 28 provided between the first ends 20a, 22a of the ring segments 20, 22. The plate 50 is secured onto the first end 22a of the ring segment 22 by screwing. The plate 50 comprises an upper surface 50a which is flush with the raceway of the inner ring such as to prevent surface discontinuity at the level of the space 28. The plate 50 forms locally a raceway for the rollers 16. A similar plate (not visible) is also foresee to close the space provided between the second ends of the ring segments 20, 22.

As previously mentioned, the outer ring 14 is also provided with the ring segments 24, 26 identical one to another.

Each ring segment 24, 26 comprises a first end 24a, 26a and a second end (not visible in Figures) which delimit the ring segment in the circumferential direction. The first ends 24a, 26a of the ring segments 24, 26 face each other in the circumferential direction. A circumferential space 52 is provided between the first ends 24a, 26a. The second ends of the ring segments 24, 26 also face each other in the circumferential direction. A circumferential space is also provided between these second ends.

Similarly to the ring segments 20 and 22, the rolling bearing 10 comprises an axial pin 54 and a radial pin 56 circumferentially interposed between the first ends 24a, 26a of the ring segments 24, 26.

As shown on FIGS. 1, 2 and 3, a first axial recess 58 is formed on each first end 24a, 26a of the ring segments 24, 26. The recesses 58 face each other in the circumferential direction. The recesses 58 are identical. Each recess 58 extends axially from the lateral face of the ring segment 24, 26 delimiting partly the lateral face 12c of the inner ring. Each recess 58 extends axially into the thickness of the ring segment 24, 26.

A second radial recess 60 is also formed on each first end 24a, 26a of the ring segments 24, 26. Only the second radial recess 60 formed on the first end 26a of the ring segment 20, 22 is visible (FIG. 4). The second radial recesses 60 face each other in the circumferential direction. The recesses 60 are identical. Each recess 60 extends radially from the outer surface of the ring segment 24, 26 delimiting partly the outer surface 14b of the outer ring. Each recess 60 extends radially into the thickness of the ring segment 22, 24 and remains radially distant from the bore of the ring segment. Each recess 32 is a blind recess. In the disclosed example, each radial recess 60 extends through the axial recess 58. Alternatively, the radial recess 60 may be spaced apart with respect to the axial recess 58 in the radial direction.

The axial pin 54 extends into both the recesses 58 of the ring segments 24, 26 of the inner ring. The pin 54 extends axially into the recesses 58. The pin 54 is entirely housed inside the recesses 58 in the axial direction. The pin 54 is set back with respect to the lateral faces of the inner ring. The pin 34 also extends circumferentially into the recesses 58. The pin 54 is secured onto one of the first ends 24a, 26a of the ring segments 24, 26 of the inner ring, here onto the first end 26a. The pin 54 may be secured onto the first end 26a by any appropriate means, here by screwing.

The radial pin 56 extends into both the recesses 60 of the ring segments 24, 26 of the outer ring. The pin 56 extends radially into the recesses 60. The pin 56 is entirely housed inside the recesses 60 in the radial direction. The pin 56 is set back with respect to the outer surface 14b of the outer ring. The pin 56 also extends circumferentially into the recesses 60. Similarly to the axial pin 54, the radial pin 56 is also secured onto the first end 26a of the ring segment 26 by screwing. The shape of the recesses 58, 60 is complementary to that of the associated pin 54, 56.

Similarly to the first ends 24a, 26a of the ring segments 20, 22 of the outer ring, the rolling bearing 10 also comprises an axial pin and a radial pin (not visible in Figures) which are circumferentially interposed between the second ends of the ring segments 24, 26.

The rolling bearing 10 further comprises fixing means 62 to secure together the ring segments 24, 26 of the outer ring. The fixing means 62 comprise a plate ring 64 mounted onto the outer surface of the outer ring 14, and a plurality of radial screws 66 to secure the plate ring onto the outer ring. The plate ring 64 may be annular or be split into several parts.

The rolling bearing 10 further comprises a plate 68 which closes the space 52 provided between the first ends 24a, 26a of the ring segments 24, 26. The plate 68 is secured onto the first end 26a of the ring segment 26 by screwing. The plate 68 comprises a lower surface (not referenced) which is flush with the bore 14a of the outer ring. The plate 68 forms locally a raceway for the rollers 16. A similar plate (not visible) is also foresee to close the space provided between the second ends of the ring segments 24, 26.

Otherwise, as previously mentioned, in this illustrated example, both the inner and outer rings 12, 14 of the rolling bearing are formed as split rings. As an alternative, the rolling bearing could have only one ring formed by successive circumferential ring segments.

Figure 5:
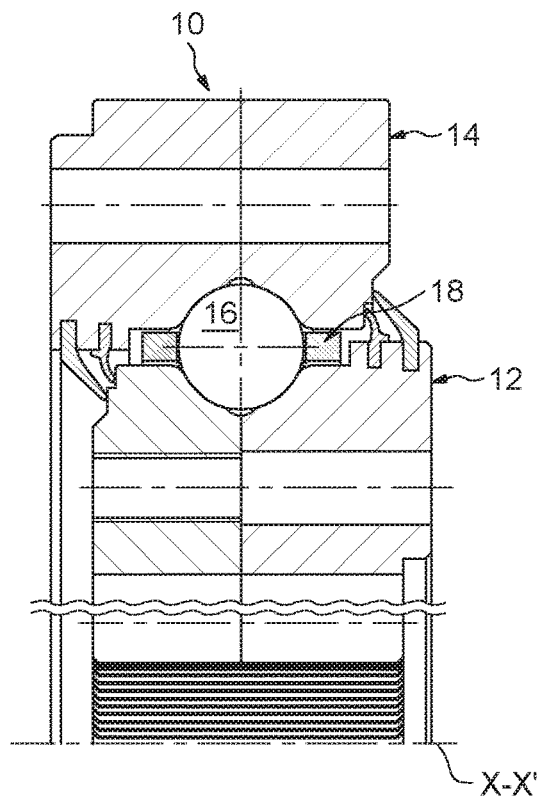
FIG. 5 is a partial section of a rolling bearing according to a second example of the invention.
Figure 7:
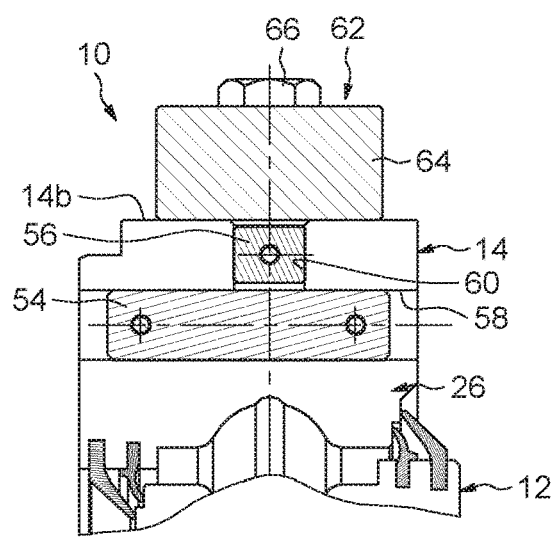
FIG. 7 is a partial section on VII-VII of FIG. 6.
Figure 6:
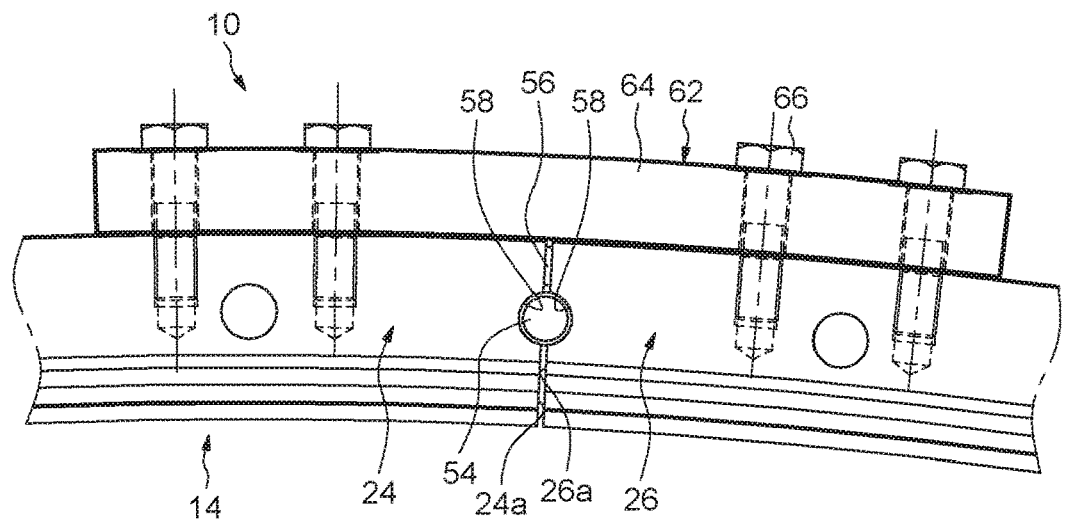
FIG. 6 is a partial side view of the rolling bearing of FIG. 5.

For example, in the example shown on FIGS. 5 to 7, in which identical parts are given identical references, only the outer ring 14 is formed by the successive circumferential ring segments 24, 26. In this example, the plate ring 64 extends over a limited angular sector. A similar plate ring (not visible) is diametrically opposed. With regard to the first example, the relative radial disposition of the pins 54, 56 is inverted.

In this example, the inner ring 12 comprises two parts stacked one relative to the other in the axial direction. The two parts of the inner ring 12 are provided with a plurality of aligned through-holes (not referenced) in order to be joined by fitting bolts (not shown).

The invention claimed is:

1. A rolling bearing comprising:
    an inner ring,
    an outer ring, at least the inner ring or the outer ring being split into a plurality of successive circumferential ring segments,
    at least one alignment member circumferentially interposed between each pair of facing ends of the successive ring segments of the split-ring, each pair of facing ends comprising a first facing end and a second facing end, the alignment member being secured onto one of the first facing ends and protruding into a recess formed onto one of the second facing ends to align the pair of facing ends in radial and axial directions,
    wherein the at least one alignment member comprises a first alignment member extending axially and a second alignment member extending radially that are circumferentially interposed between the pair of facing ends of the successive ring segments of the split-ring.

2. The rolling bearing according to claim 1, wherein the at least one alignment member is secured into a recess formed onto the first facing end, the recess facing the recess formed onto the second facing end.

3. The rolling bearing according to claim 1, wherein each of the first and second alignment members comprises a pin.

4. The rolling bearing according to claim 1, wherein a circumferential space is provided between each pair of facing ends of the successive ring segments of the split-ring.

5. The rolling bearing according to claim 1, wherein the alignment member is set back or flush with respect to frontal faces of the split-ring, and/or is set back or flush with respect to the bore and the outer surface of the split-ring.

6. A rolling bearing comprising:
an inner ring,
an outer ring, at least the inner ring or the outer ring being split into a plurality of successive circumferential ring segments,
at least one alignment member circumferentially interposed between each pair of facing ends of the successive ring segments of the split-ring, each pair of facing ends comprising a first facing end and a second facing end, the alignment member being secured onto one of the first facing ends and protruding into a recess formed onto one of the second facing ends to align the pair of facing ends in radial and axial directions, and
a fixing means to secure together the successive ring segments of the split-ring.

7. The rolling bearing according to claim 6, wherein the fixing means are secured onto the outer surface of the split-ring.

8. A rolling bearing comprising:
an inner ring,
an outer ring, at least the inner ring or the outer ring being split into a plurality of successive circumferential ring segments,
at least one alignment member circumferentially interposed between each pair of facing ends of the successive ring segments of the split-ring, each pair of facing ends comprising a first facing end and a second facing end, the alignment member being secured onto one of the first facing ends and protruding into a recess formed onto one of the second facing ends to align the pair of facing ends in radial and axial directions,
wherein a circumferential space is provided between each pair of facing ends of the successive ring segments of the split-ring
wherein a plate is provided circumferentially interposed between the pair of facing ends to close the circumferential space.

9. The rolling bearing according to claim 8, further comprising at least one row of rolling elements radially interposed between raceways of the inner and outer rings, the plate delimiting locally the raceway of the split-ring.

10. A rolling bearing comprising:
an inner ring,
an outer ring, at least the inner ring or the outer ring being split into a plurality of successive circumferential ring segments,
at least one alignment member circumferentially interposed between each pair of facing ends of the successive ring segments of the split-ring, each pair of facing ends comprising a first facing end and a second facing end, the alignment member being secured onto one of the first facing ends and protruding into a recess formed onto one of the second facing ends to align the pair of facing ends in radial and axial directions, and
a plate positioned on an outer surface of the outer ring and overlapping the first facing end and the second facing end of one pair of facing ends and is configured to secure the first facing end and the second facing end together.

11. The rolling bearing of claim 10, further comprising a plurality of radially aligned fasteners securing the plate to the outer ring.

* * * * *